(12) United States Patent
Maienschein

(10) Patent No.: US 11,788,614 B2
(45) Date of Patent: Oct. 17, 2023

(54) TORQUE TRANSMISSION DEVICE

(71) Applicant: Schaeffler Technologies AG & Co. KG, Herzogenaurach (DE)

(72) Inventor: Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/638,515

(22) PCT Filed: Jul. 8, 2020

(86) PCT No.: PCT/DE2020/100600
§ 371 (c)(1),
(2) Date: Feb. 25, 2022

(87) PCT Pub. No.: WO2021/043353
PCT Pub. Date: Mar. 11, 2021

(65) Prior Publication Data
US 2022/0403926 A1     Dec. 22, 2022

(30) Foreign Application Priority Data
Sep. 5, 2019 (DE) .......................... 102019123789.0

(51) Int. Cl.
*F16H 45/02* (2006.01)
*B60K 6/38* (2007.10)
(Continued)

(52) U.S. Cl.
CPC ......... *F16H 45/02* (2013.01); *F16D 25/0638* (2013.01); *B60K 6/387* (2013.01);
(Continued)

(58) Field of Classification Search
CPC ....... B60K 6/40; B60K 6/48; F16H 2045/002; F16H 2045/0247; F16H 2045/0294; F16H 45/02–2015/0294
See application file for complete search history.

(56) References Cited

U.S. PATENT DOCUMENTS 7,114,604 B2 * 10/2006 Masuya ................. B60K 6/387
192/3.3
8,585,541 B2   11/2013 Mueller
(Continued)

FOREIGN PATENT DOCUMENTS

DE   10 2007 053 971 A1   6/2008
DE   10 2009 020 672 A1   12/2009
EP       1 541 401 A1   6/2005

Primary Examiner — Jacob S. Scott
Assistant Examiner — Farhana Pervin
(74) Attorney, Agent, or Firm — Volpe Koenig

(57) ABSTRACT

The disclosure relates to a torque transmission device between a first drive element and an output element, having a torque transmission unit; an input, which is rotatable about a rotation axis and can be coupled to the first drive element, and an output, which can be connected to the output element. A separating clutch is arranged outside of the torque transmission unit and the fluid chamber, and is designed for selective torque transmission between the first drive element and the torque transmission unit. The separating clutch has a clutch input and a clutch output that is selectively connectable via a clutch actuating device.

19 Claims, 1 Drawing Sheet

(51) Int. Cl.
 *F16D 25/0638* (2006.01)
 *B60K 6/387* (2007.10)
 *F16D 21/06* (2006.01)
 *F16H 45/00* (2006.01)

(52) U.S. Cl.
 CPC ... *B60Y 2200/92* (2013.01); *F16D 2021/0661* (2013.01); *F16H 2045/002* (2013.01)

(56) References Cited

U.S. PATENT DOCUMENTS

| | | | |
|---|---|---|---|
| 2008/0156608 A1* | 7/2008 | Kombowski | F16D 21/06 192/48.1 |
| 2009/0305847 A1* | 12/2009 | Klump | F16D 48/06 477/86 |
| 2010/0038201 A1* | 2/2010 | Mueller | F16D 25/0638 903/914 |
| 2010/0081540 A1* | 4/2010 | Krause | B60K 6/48 477/3 |
| 2010/0193320 A1* | 8/2010 | Kombowski | F16H 45/02 192/30 V |
| 2015/0323060 A1* | 11/2015 | Torii | F16H 3/663 475/116 |

\* cited by examiner

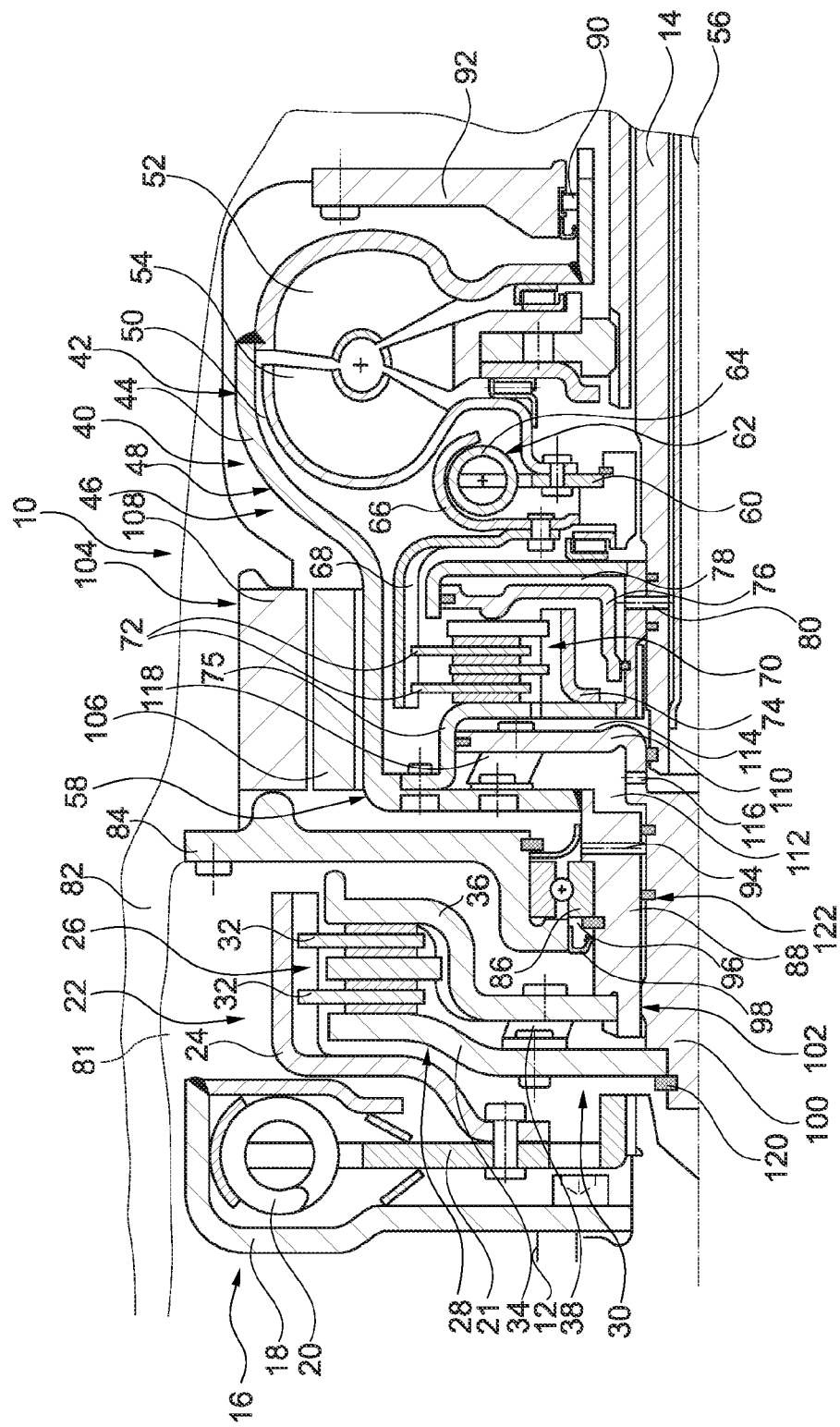

TORQUE TRANSMISSION DEVICE

CROSS-REFERENCE TO RELATED APPLICATIONS

This application is the U.S. National Phase of PCT Application No. PCT/DE2020/100600, filed Jul. 8, 2020, which claims priority from German Patent Application No. 10 2019 123 789.0, filed Sep. 5, 2019, the entire disclosures of which are incorporated by reference herein.

TECHNICAL FIELD

The disclosure relates to a torque transmission device.

BACKGROUND

A torque transmission device is known, for example, from DE 10 2009 020 672 A1. The torque transmission device is arranged in a hybrid drive train of a vehicle between an internal combustion engine and a transmission and comprises a torque transmission unit which has a torque converter, a wet-running separating clutch and an electric motor. The electric motor, the separating clutch and the torque converter are designed as preassembled structural units and in the assembled state, the torque converter and the separating clutch are sealed from the electrical motor in a liquid-tight manner.

SUMMARY

At least one object of the present disclosure is to provide a simpler and more reliable design of a torque transmission device. It is intended to become simpler and more accurate to actuate the separating clutch.

At least one of these objects is achieved by a torque transmission device with the features disclosed herein. As a result, the separating clutch can be actuated simply and reliably within the housing via an actuating force. The risk of contamination of the separating clutch with leakage oil is reduced.

The torque transmission device can be arranged in a drive train of a vehicle. The first drive element can be an internal combustion engine. A second drive element, in particular in an electric motor, for providing a drive torque can be connected to the torque transmission unit, preferably to the input. The output element can be a transmission.

The torque transmission unit can have a torque converter, a clutch, in particular a wet starting clutch or a wet dual clutch, a torsional vibration damper and/or a centrifugal pendulum.

The torque transmission unit can be supported on a receiving housing via a support bearing arranged axially between the separating clutch and the torque transmission unit. The support bearing can have a slide bearing and/or a roller bearing. The support bearing can be arranged on a separating wall. The separating wall can extend axially between the separating clutch and the torque transmission unit, mainly in a radial direction.

The housing can be formed at least in sections by a converter housing of the torque converter. The liquid arranged in the first fluid chamber can be a working fluid of the torque converter, in particular to effect a torque transmission between a pump wheel and a turbine wheel of the torque converter.

The first fluid chamber can be completely filled with the liquid. The fluid pressure acting on the actuating element can be provided by the same liquid that can also be received within the first fluid chamber.

The second fluid chamber can have a fluid that is separate from the liquid in the first fluid chamber. The fluid can be air or a liquid. The liquid in the second fluid chamber can effect spray-cooling of the separating clutch.

The separating clutch can be a K0 clutch. The separating clutch can be operated in a dry manner or with spray-cooling. The separating clutch can be designed as a multi-plate clutch with several friction plates.

The clutch input can be connected to a torsional vibration damper effectively arranged between the first drive element and the separating clutch. The torsional vibration damper can have a centrifugal pendulum. The torsional vibration damper can be designed as a dual-mass flywheel.

The actuating element can be assigned a restoring element for resetting the actuating element from a closed position which actuates the clutch into an open position. The restoring element can comprise a leaf spring and/or a compression spring.

The transmission element can extend through the housing in a sealing manner, in particular in a liquid-tight manner. The transmission element is preferably movable, in particular rotatable and/or displaceable with respect to the housing.

The tractive force can act in an axial direction pointing from the separating clutch to the torque transmission unit. The pressing element can be arranged on the axial side of the separating clutch that faces away from the torque transmission unit.

In a preferred embodiment of the disclosure, the actuating element is assigned a pressure chamber within the housing for the application of a fluid pressure causing the actuating force. As a result, the clutch can be actuated hydraulically via the pressure chamber inside the housing.

The actuating element can be designed as an actuating piston, which can be displaced within the pressure chamber. The actuating element can be arranged axially between the pressure chamber and a counterpressure chamber. The counterpressure chamber can effect a centrifugal force compensation of the fluid pressure in the pressure chamber. The counter-pressure chamber can be completely filled with the liquid of the first fluid chamber.

In a specific embodiment of the disclosure, the separating clutch comprises a friction device and the actuating element is connected to a pressing element via the transmission element for transmitting the actuating force as a pressing force to the friction device. The pressing element can be assigned to the clutch output. The pressing element can be connected to the actuating element in a rotationally fixed and/or axially fixed manner. The pressing element can be an actuating flange.

The pressing element can be supported by a support element. The support element can be assigned to the clutch output.

A restoring element can be arranged effectively between the pressing element and the supporting element. The restoring element can have at least one leaf spring and/or compression spring. If the actuating force is absent, the restoring element can bring about the resetting of the separating clutch from an open position to a closed position.

In a further specific embodiment of the disclosure, the pressing element is arranged outside of the first fluid chamber and inside of the second fluid chamber. As a result, the pressing element is assigned directly to the separating clutch.

In a preferred embodiment of the disclosure, the pressing element and the actuating element are firmly connected to one another via the transmission element. As a result, the actuating force can be transmitted directly from the actuating element to the pressing element.

The transmission element can be designed as a traction rod. The transmission element can be designed in one piece with the pressing element and/or the actuating element.

In a specific embodiment of the disclosure, the transmission element is guided through the housing in an axially movable manner depending on the movement of the actuating element. As a result, the actuating force between the actuating element and the pressing element can be transmitted through the housing and a reliable sealing of the first fluid chamber can nevertheless be effected.

In a further specific embodiment of the disclosure, the transmission element has at least one sealing device effective with respect to a connection component for sealing the first fluid chamber. The sealing device can have at least one sealing element, for example, a shaft sealing ring or an O-ring, effective between the connection component and the transmission element. The transmission element can extend radially inward from the connection component.

The support element can be firmly connected to the connection component in at least one axial direction. The support element can be connected to the connection component in a non-rotatable manner.

In a preferred embodiment of the disclosure, the transmission element and/or the connection component cause/s an at least partial torque transmission of the first drive torque provided by the first drive element from the separating clutch to the torque transmission unit.

In a specific embodiment of the disclosure, the actuating force can be supported via the connection component. The actuating force can be supported via the connection component and the support bearing.

In a preferred embodiment of the disclosure, the actuating element is movable against the effect of a restoring force caused by a restoring element, wherein the restoring element is attached to the connection component or a component connected to the connection component, for example the housing wall.

BRIEF DESCRIPTION OF THE DRAWINGS

Further advantages and advantageous embodiments of the disclosure result from the description of the FIGURE and from the drawing.

The disclosure is described in detail below with reference to the drawing.

FIG. 1 shows a half-section of a torque transmission device 10 in a specific embodiment of the disclosure.

DETAILED DESCRIPTION

As shown in FIG. 1, the torque transmission device 10 is arranged in a drive train of a vehicle. The torque transmission device 10 is connected to a first drive element 12, in particular an internal combustion engine, and enables torque transmission from the first drive element 12 to an output element, in particular a transmission, which is connected to the torque transmission device 10 via a transmission input shaft 14.

The first drive element 12 is connected to a torsional vibration damper 16. The first drive element 12 is screwed onto a damper input 18. The damper input 18 can be rotated to a limited extent with respect to a damper output 21 via the effect of at least one spring element 20, herein in particular an arc spring. The torsional vibration damper 16 is designed herein as a dual-mass flywheel and is connected to a separating clutch 22. The separating clutch 22 comprises a clutch input 24, which is riveted to the damper output 21. The clutch input 24 is selectively connectable, via a friction device 26, to a clutch output 28 via the effect of a clutch actuating device 30. The clutch input 24 is designed herein as an outer plate carrier, which is connected in a toothed manner to friction plates 32. When the separating clutch 22 is closed, the friction plates 32 are connected to the clutch output 28 to enable torque transmission. The clutch output 28 comprises a pressing element 34 and a support element 36, both of which are non-rotatably connected via a restoring element 38, which comprises leaf springs herein. The restoring element 38 effects a restoring force between the pressing element 34 and the support element 36, which forces the two components away from one another.

The separating clutch 22 is connected to a torque transmission unit 40, herein a torque converter 42. The separating clutch 22 effects a torque transmission between the first drive element 12 and the torque transmission unit 40 when the separating clutch 22 is closed. When the separating clutch 22 is open, however, the torque transmission path between the first drive element 12 and the torque transmission unit 40 is interrupted. The torque transmission unit 40 has a housing 46 having at least one housing wall 44, herein a converter housing 48, for delimiting a first fluid chamber 50 that can be filled with a liquid. The liquid is preferably a working fluid of the torque converter 42 for effecting a torque transmission between a pump wheel 52 and a turbine wheel 54 within the housing 46 in the first fluid chamber 50.

The torque converter 42 has an input 58 rotatable about an axis of rotation 56, herein formed by the converter housing 48, which is connected to an output, herein the transmission input shaft 14. The turbine wheel 54 is riveted to a damper outlet 60 of a torsional vibration damper 62 located in the first fluid chamber 50. The damper output 60 can, to a limited extent, be rotated with respect to a damper input 66 via the action of at least one spring element 64, herein a compression spring. The damper input 66 is riveted to a clutch output 68 of a converter bridging clutch 70. Herein, the clutch output 68 is an outer plate carrier which is connected to friction plates 72 in a toothed manner. When the converter bridging clutch 70 is closed, the friction plates 72 are connected to a clutch input 74 of the converter bridging clutch 70 to effect torque transmission via the converter bridging clutch 70. The clutch input 74 is firmly connected to the housing 46 via a connecting flange 75. The converter bridging clutch 70 can be actuated via an axially displaceable actuating element 76. The actuating element 76 is actuated by a fluid pressure of the liquid in the first fluid chamber 50 within a pressure chamber 78, which is connected to a fluid channel in the transmission input shaft 14 via a fluid opening 80, in order to actuate the converter bridging clutch 70.

The separating clutch 22 is arranged outside of the torque transmission unit 40 and the first fluid chamber 50 is arranged in a second fluid chamber 81 which is separated therefrom in a fluid-tight manner. The separating clutch can preferably be operated in a dry manner, wherein the fluid contained in the second fluid chamber 81 is air, or be operated with a spray-cooling method, wherein a cooling oil is present in the second fluid chamber 81 in addition to the air.

The separating clutch 22 and the torque transmission unit 40 are received in a receiving housing 82, in particular a transmission housing. The receiving housing 82 is firmly connected to a separating wall 84 which is arranged axially between the separating clutch 22 and the torque converter 42. The separating wall 84 extends radially inward and, on an inner section, receives a support bearing 86 for supporting the torque transmission unit 40. The support bearing 86 is in particular a roller bearing and is axially secured by means of securing rings on the separating wall 84 and on a connection component 88 which is arranged radially inside of the separating wall 84. Furthermore, the torque transmission unit 40 is supported on the receiving housing 82 via a further support bearing 90 and a support flange 92. The two support bearings 86, 90 are arranged on axially opposite sides of the torque transmission unit 40.

The connection component 88 is connected to the support element 36 and to the converter housing 48. The connection component 88 has a lubricant channel 94 for supplying a lubricant chamber 96 for the support bearing 86. The lubrication of the support bearing 86 can be effected by a leakage liquid, for example via the liquid contained in the first fluid chamber 50. The lubricant chamber 96 is sealed by a sealing element 98 which is effectively arranged between the separating wall 84 and the connection component 88.

A drive torque of the first drive element 12 transmitted through the closed separating clutch 22 is transmitted to the input 58 via the clutch output 28, herein via the pressure element 34 to a transmission element 100, which is arranged radially inside of the connection component 88. The transmission element 100 is connected to the connection component 88 in a rotationally fixed and axially displaceable manner with respect to the connection component 88 via a toothing 102. The torque thus reaches the converter housing 48 from the clutch output 28 via the transmission element 100 and the connection component 88. The converter housing 48 is connected to an electric motor 104 as a second drive element. A rotor 106 of the electric motor 104 is non-rotatably connected to the converter housing 48. The rotor 106 is rotatable with respect to a stator 108, which is arranged in the receiving housing 82.

In this arrangement, the separating clutch 22 is a K0 clutch, which transmits torque between the first drive element 12 and the torque transmission unit 40 and, in the open position, decouples the first drive element 12 from the torque transmission unit 40, thereby allowing the vehicle to be driven, for example, via the electric motor 104. The separating clutch 22 is actuated by the clutch actuating device 30. Herein, the clutch actuating device 30 consists of the pressure element 34, the transmission element 100 connected thereto and the actuating element 110 designed in one piece out of the transmission element 100. The actuating element 110 can be moved axially together with the transmission element 100 and the pressing element 34.

An actuating force on the actuating element 110 is effected by a fluid pressure of the liquid in a pressure chamber 112 within the housing 46 and is transmitted as a pressing force to the friction device 26 via the transmission element 100 and the pressing element 34. A counterpressure chamber 114, which is filled with the liquid present within the first fluid chamber 50, is arranged on a side of the actuating element 110 opposite the pressure chamber 112. The counterpressure chamber 114 effects a centrifugal force compensation with respect to the fluid pressure within the pressure chamber 112. The pressure chamber 112 can be supplied with the liquid via a pressure medium hole 116. The actuating element 110 is displaceable against the effect of a restoring element 118, herein in particular consisting of leaf springs, which is riveted to the housing 46.

Instead of or in addition to a transmission between the transmission component 100 and the connection component 88, the torque from the clutch output 28 can be transmitted to the actuating element 110 via the toothing 102, via the transmission element 100 and to the housing 46 via the restoring element 118. Parallel torque transmission can also be effected to the housing 46 via the support element 36 and the connection component 88.

The separating clutch 22 is actuated to close the separating clutch 22 by applying pressure to the fluid introduced into the pressure chamber 112. The fluid pressure in the pressure chamber 112 is preferably provided by the same liquid that is also arranged within the first fluid chamber 50. The actuating force is effected within the housing 46 and the actuating element 110 is pressed away to the right from the housing 46 and the actuating force is applied as a tractive force via the transmission element 100 to the pressing element 34, which is connected to the transmission element 100 by a securing ring 120, to the separating clutch 22. As a result, the separating clutch 22 can be actuated simply and reliably within the housing 46 via an actuating force. The risk of contamination of the separating clutch 22 with leakage oil is reduced. The actuating force when the separating clutch 22 is actuated is supported on the separating wall 84 via the support element 36 and the connection component.

The first fluid chamber 50 is sealed by a sealing device 122, which is effectively arranged between the transmission element 100 and the connection component 88, in particular having a sealing element, for example an O-ring. The sealing device 122 enables a seal with a possible axial displacement of the transmission element 100 with respect to the connection component 88 at the same time.

LIST OF REFERENCE NUMERALS 10 torque transmission device
12 first drive element
14 transmission input shaft
16 torsional vibration damper
18 damper input
20 spring element
21 damper output
22 separating clutch
24 clutch input
26 friction device
28 clutch output
30 clutch actuating device
32 friction plate
34 pressing element
36 supporting element
38 restoring element
40 torque transmission unit
42 torque converter
44 housing wall
46 housing
48 converter housing
50 first fluid chamber
52 pump wheel
54 turbine wheel
56 axis of rotation
58 input
60 damper output
62 torsional vibration damper
64 spring element
66 damper input
68 clutch output
70 converter bridging clutch
72 friction plate 74 clutch input
75 connecting flange
76 actuating element
78 pressure chamber
80 fluid opening
81 second fluid chamber
82 receiving housing
84 separating wall
86 support bearing
88 connection component
90 support bearing
92 support flange
94 lubricant channel
96 lubricant chamber
98 sealing element
100 transmission element
102 toothing
104 electric motor
106 rotor
108 stator
110 actuating element
112 pressure chamber
114 counterpressure chamber
116 pressure medium hole
118 restoring element
120 securing ring
122 sealing device

The invention claimed is:

1. A torque transmission device for transmitting a torque between a first drive element and an output element, the torque transmission device comprising:
a torque transmission unit which has a housing having at least one housing wall for delimiting a first fluid chamber which is fillable with a liquid;
an input, which is rotatable about a rotation axis and configured to be coupled to the first drive element, an output, which can configured to be connected to the output element, and a separating clutch, which is arranged outside of the torque transmission unit and the first fluid chamber in a second fluid chamber that is separated therefrom in a fluid-tight manner, and which is configured for selective torque transmission between the first drive element and the torque transmission unit, which separating clutch has a clutch input and a clutch output that is selectively connectable thereto via a clutch actuating device having an actuating element, wherein an actuating force acting on the actuating element within the housing is transmittable via a transmission element extending through the housing to the separating clutch as a tractive force for closing the separating clutch.

2. The torque transmission device according to claim 1, wherein the actuating element is assigned a pressure chamber within the housing for the application of a fluid pressure causing the actuating force.

3. The torque transmission device according to claim 1, wherein the separating clutch comprises a friction device and the actuating element is connected to a pressing element via the transmission element for transmitting the actuating force as a pressing force on the friction device.

4. The torque transmission device according to claim 3, wherein the pressing element is arranged outside of the first fluid chamber and inside of the second fluid chamber.

5. The torque transmission device according to claim 3, wherein the pressing element and the actuating element are firmly connected to one another via the transmission element.

6. The torque transmission device according to claim 1, wherein the transmission element is guided through the housing so as to be axially movable depending on the movement of the actuating element.

7. The torque transmission device according to claim 1, wherein the transmission element has at least one sealing device for sealing the first fluid chamber with respect to a connection component.

8. The torque transmission device according to claim 7, wherein at least one of the transmission element or the connection component effect at least partial torque transmission of the first drive torque provided by the first drive element from the separating clutch to the torque transmission unit.

9. The torque transmission device according to claim 7, wherein the actuating force is configured to be supported via the connection component.

10. The torque transmission device according to claim 7, wherein the actuating element is movable against a restoring force caused by a restoring element, wherein the restoring element is attached to the connection component or a component connected to the connection component.

11. A torque transmission device for transmitting torque between a first drive element and an output element, the torque transmission device comprising:
a torque transmission unit including a housing, an input that is rotatable and configured to be coupled to the first drive element, and an output configured to be connected to the output element;
a clutch actuating device having an actuating element and a separating clutch configured for selective torque transmission between the first drive element and the torque transmission unit; and
a transmission element configured to transmit an actuating force to the actuating element for closing the separating clutch, wherein the transmission element extends through the housing to the separating clutch;
wherein the torque transmission unit includes a housing having at least one housing wall that partially defines a first fluid chamber, the separating clutch is arranged outside of the torque transmission unit and the first fluid chamber and is arranged inside of a second fluid chamber that is separated therefrom in a fluid-tight manner.

12. The torque transmission device according to claim 11, wherein the actuating element partially defines a pressure chamber within the housing for application of a fluid pressure causing the actuating force.

13. The torque transmission device according to claim 11, wherein the separating clutch comprises a friction device and the actuating element is connected to a pressing element via the transmission element for transmitting the actuating force as a pressing force on the friction device.

14. The torque transmission device according to claim 13, wherein the pressing element is arranged outside of the first fluid chamber and is arranged inside of the second fluid chamber.

15. The torque transmission device according to claim 11, wherein the transmission element is configured to be guided through the housing such that the transmission element is axially displaceable depending on movement of the actuating element.

16. The torque transmission device according to claim 11, wherein the transmission element has at least one sealing device for sealing the first fluid chamber with respect to a connection component.

17. The torque transmission device according to claim 16, wherein at least one of the transmission element or the connection component provide at least partial torque transmission of the first drive torque provided by the first drive element from the separating clutch to the torque transmission unit.

18. The torque transmission device according to claim 16, wherein the actuating force is configured to be supported via the connection component.

19. The torque transmission device according to claim 16, wherein the actuating element is movable against a restoring force generated by a restoring element, wherein the restoring element is attached to the connection component or a component connected to the connection component.

\* \* \* \* \*